US011154951B2

United States Patent
Gong et al.

(10) Patent No.: US 11,154,951 B2
(45) Date of Patent: Oct. 26, 2021

(54) LASER 3D PRINTING FORMING SYSTEM OF AMORPHOUS ALLOY FOIL AND FORMING METHOD THEREOF

(71) Applicant: HUAZHONG UNIVERSITY OF SCIENCE AND TECHNOLOGY, Hubei (CN)

(72) Inventors: Pan Gong, Hubei (CN); Fangwei Li, Hubei (CN); Xinyun Wang, Hubei (CN); Jianhua Mo, Hubei (CN); Lei Deng, Hubei (CN); Junsong Jin, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 658 days.

(21) Appl. No.: 15/934,405

(22) Filed: Mar. 23, 2018

(65) Prior Publication Data

US 2019/0232430 A1    Aug. 1, 2019

(30) Foreign Application Priority Data

Jan. 30, 2018  (CN) .......................... 201810087943.0

(51) Int. Cl.
*B23K 26/342*    (2014.01)
*B23K 35/02*    (2006.01)
(Continued)

(52) U.S. Cl.
CPC .......... *B23K 26/342* (2015.10); *B23K 26/142* (2015.10); *B23K 35/0233* (2013.01);
(Continued)

(58) Field of Classification Search
CPC ......... B33Y 10/00; B33Y 30/00; B33Y 70/00; B23K 26/142; B23K 26/342;
(Continued)

(56) References Cited

U.S. PATENT DOCUMENTS

| 6,100,508 A * | 8/2000 | Kubik | ..................... D21F 5/024 |
| | | | 219/469 |
| 2007/0286658 A1* | 12/2007 | Hayashi | ............. G03G 15/6582 |
| | | | 399/407 |

(Continued)

FOREIGN PATENT DOCUMENTS

| GN | 105728728 | 7/2016 |
| GN | 106978577 | 7/2017 |

OTHER PUBLICATIONS

Y. Li et al., "Building metallic glass structures on crystalline metal substrates by laser-foil-printing additive manufacturing," Journal of Materials Processing Tech, vol. 248 (2017), p. 249-261.

*Primary Examiner* — Tu B Hoang
*Assistant Examiner* — Alba T Rosario-Aponte
(74) *Attorney, Agent, or Firm* — Hamre, Schumann, Mueller & Larson, P.C.

(57) ABSTRACT

The invention belongs to the field of additive manufacturing of amorphous alloy, and discloses a laser 3D printing forming system of amorphous alloy foil and a forming method thereof. The unnecessary material of the amorphous alloy foil is cut by a first laser and then the remaining portion is selectively scanned and heated by a second laser so that the amorphous alloy is heated to be in a superplastic state in the supercooled liquid region. Then, the amorphous alloy foil is rolled by a preheated roller in combination with the ultrasonic vibration to achieve interatomic bonding between layers of the amorphous alloy foil, and the amorphous alloy foil is then rapidly cooled, so that an amorphous alloy part with a large size, a complicated shape and a porous structure is formed. The invention has overcome the limitation of the size and shape of the amorphous alloy prepared by the traditional amorphous alloy preparation methods, and uses amorphous alloy foil as a raw material, which has lower cost than the traditional 3D printing amorphous powder. In (Continued)

addition, a roller is used to roll the ultra-thin amorphous alloy foil such that the prepared amorphous alloy part has a more compact internal structure.

9 Claims, 4 Drawing Sheets

(51) Int. Cl.
*B23K 26/142* (2014.01)
*C22C 45/00* (2006.01)
*C22C 45/10* (2006.01)
*C22C 45/02* (2006.01)
*B33Y 10/00* (2015.01)
*B33Y 30/00* (2015.01)
*B33Y 70/00* (2020.01)

(52) U.S. Cl.
CPC ............ *C22C 45/00* (2013.01); *C22C 45/001* (2013.01); *C22C 45/02* (2013.01); *C22C 45/10* (2013.01); *B33Y 10/00* (2014.12); *B33Y 30/00* (2014.12); *B33Y 70/00* (2014.12)

(58) Field of Classification Search
CPC ..... B23K 35/0233; C22C 45/02; C22C 45/10; C22C 45/00; B29C 64/20; B29C 64/223; B29C 64/218; B29C 64/268; B29C 64/147; B29C 64/10
USPC ....................................................... 219/121.6
See application file for complete search history.

(56) References Cited

U.S. PATENT DOCUMENTS

| | | | |
|---|---|---|---|
| 2014/0035423 A1* | 2/2014 | Veronesi | H02K 15/0012 310/194 |
| 2014/0170012 A1* | 6/2014 | Delisle | B22F 3/1055 419/6 |
| 2015/0076951 A1* | 3/2015 | Lynch | H02K 3/50 310/195 |
| 2016/0009062 A1* | 1/2016 | Keenan | B29C 64/141 156/308.4 |
| 2017/0106471 A1* | 4/2017 | Yoshii | B23K 26/147 |
| 2018/0229332 A1* | 8/2018 | Tsai | B23K 26/082 |
| 2019/0039135 A1* | 2/2019 | Hollahan | B29C 64/124 |
| 2019/0143587 A1* | 5/2019 | Mamrak | B29C 64/268 264/401 |

* cited by examiner

LASER 3D PRINTING FORMING SYSTEM OF AMORPHOUS ALLOY FOIL AND FORMING METHOD THEREOF

BACKGROUND OF THE INVENTION

Field of the Invention

The invention belongs to the field of additive manufacturing of amorphous alloy, and more particularly, relates to a laser 3D printing forming system of amorphous alloy foil and a forming method thereof.

Description of the Related Art

Compared with traditional crystalline alloys, amorphous alloys have obvious advantages in many aspects, which are mainly manifested as high strength, good wear and corrosion resistance, excellent soft magnetic and hard magnetic properties and so on. In addition, amorphous alloys exhibit superplasticity in the supercooled liquid region, which facilitates thermoplastic forming. Amorphous alloys have a wide range of applications in aerospace, precision instruments, military, chemical and other fields due to their excellent properties.

For amorphous alloys, there exists a large limitation in size in the forming process due to their requirement for the cooling rate. At present, amorphous alloys formed by the copper mold casting method and the water quenching method have a very small size, and the current largest size is only about 80 mm, which limits their application scope as structural materials and industrial materials.

In order to prepare large-size amorphous alloys, there are already some forming methods. For example, in the most popular selective laser sintering method of amorphous alloy powder, as described in Chinese patent application No. 201710229363.6 entitled "LASER 3D PRINTING METHOD OF AMORPHOUS ALLOY COMPOSITE MATERIAL," an amorphous alloy part with a large size and a complex structure is formed through heating molten powders by a high-energy laser beam. However, with this method, the prepared part has a large residual stress, which easily leads to cracking, etc. In addition, the powders have a high preparation cost and a low utilization rate. Further, an amorphous alloy part may be fabricated by a micro-droplet jetting additive manufacturing method, as described in Chinese patent application No. 201610244315.X entitled "PREPARATION AND FORMING INTEGRATED 3D PRINTING METHOD AND DEVICE OF AMORPHOUS ALLOY MATERIALS," in which crystalline molten metal is directly sprayed and in the faster cooling rate condition, amorphous alloy parts with a large size are prepared. However, the amorphous alloy parts formed by this method may not be dense enough. A 3D stacked printing technique of amorphous alloy foil is described in Yingqi Li et al., Building metal glass structures on crystalline metal base plates by laser-foil-printing additive manufacturing, in which the interatomic bonding between foils is achieved through heating the amorphous alloy foil to a molten state by a laser beam. However, in this method, the laser spot on the foil causes a wavy interface between the 3D printed layers, and obvious crystallization has occurred. A common problem with the above three 3D printing methods is that the amorphous alloy material is heated to a molten state, resulting in reheating of the previous layer material to a higher temperature when the next layer of material is heated, thereby causing crystallization. In conclusion, the existing 3D printing forming technologies of amorphous alloys cannot solve the problems that crystallization occurs in the part and the internal structure of the part is not dense. Therefore, it is an urgent problem to be solved at present that a novel process method is developed to form amorphous alloy parts with a large size, a complicated shape and a porous structure.

SUMMARY OF THE INVENTION

In view of the above-described problems, the invention provides a laser 3D printing forming system of amorphous alloy foil and a forming method thereof, in which the internal contour is preliminarily formed by a first laser, then the amorphous alloy foil is selectively heated by a second laser to a temperature between the glass transition temperature and the initial crystallization temperature of the amorphous alloy and finally the sectioning layer is rolled by a roller to achieve interatomic bonding of the adjacent sectioning layers, and it aims to improve the surface quality and density of the internal structure of the part, thus solving the technical problems that crystallization occurs in the part and the internal structure of the part is not dense.

In order to achieve the above objective, according to one aspect of the present invention, there is provided a laser 3D printing forming system of amorphous alloy foil, comprising a first laser, a second laser, a base plate, a lifting platform and a feeding mechanism, wherein, the feeding mechanism comprises a plurality of roller wheels, on which the amorphous alloy foil is wound such that feeding and discharging of the amorphous alloy foil are achieved by the rotation of a feeding roller wheel at the head end and a discharging roller wheel at the tail end; the base plate is provided below the rear end of the feeding mechanism and used as a processing platform for the amorphous alloy foil; the lifting platform is provided below the base plate to adjust the height of the base plate;

the first laser is provided above the front end of the feeding mechanism to achieve cutting of the internal contour on the amorphous alloy foil; the second laser is provided above the rear end of the feeding mechanism in a manner of being opposite to the base plate to selectively heat amorphous alloy foil on the base plate; a roller is connected to a laser head of the second laser and is used for rolling the selectively heated amorphous alloy foil; and a resistance heating rod and an ultrasonic emitter are provided in the roller, in which the resistance heating rod is used for preheating the roller to a glass transition temperature $T_g \pm 5K$, and the ultrasonic emitter is used for emitting ultrasonic waves during the rolling process to achieve ultrasonic rolling.

Preferably, an air gun is provided on one side of the first laser to remove scrap generated by cutting operation of the first laser, and meanwhile, a scrap collecting tank is provided below the first laser and the air gun to collect the scrap.

Further preferably, a suction nozzle is provided on one side of the second laser to suck and remove the scrap.

Further preferably, the first laser is a UV pulsed laser, and the second laser is a CW laser.

Further preferably, a screw is provided below the lifting platform to adjust the height of the lifting platform; the resistance heating rod is provided in the center of the roller and has the same length as the roller; and the ultrasonic emitter is provided on both ends of the roller.

A forming method for the laser 3D printing forming system of amorphous alloy foil, the method comprising:

(a) sectioning the three-dimensional structure of a desired part to obtain a plurality of sectioning layers and internal and external contour information of the part in each sectioning layer;

(b) conveying the amorphous alloy foil to a position below a first laser by a feeding mechanism, cutting the amorphous alloy foil according to the internal contour of the part in the single-layer sectioning layer by the first laser to complete processing of the internal contour in the single-layer sectioning layer, and removing cutting scrap by an air gun, the scrap falling into a scrap collecting tank;

(c) conveying the scrap-removed amorphous alloy foil to a position above a base plate and selectively heating the amorphous alloy foil by a second laser, wherein the heating area is an area between the internal contour and the external contour in the single-layer sectioning layer, and the heating temperature is between the glass transition temperature and the initial crystallization temperature of the amorphous alloy;

(d) rolling the heating area by a roller such that the heating area is welded together with the adjacent sectioning layer, removing the wad adhered to the rolled area by a suction nozzle, and lowering the lifting platform by a thickness of one sectioning layer such that peel-off operation is performed on the amorphous alloy foil along the external contour in the single-layer sectioning layer until the processing of the single-layer sectioning layer is completed, wherein a heating rod in the roller preheats the roller during the rolling process to allow the preheating temperature to be the glass transition temperature $T_g \pm 5K$ of the amorphous alloy foil, and the ultrasonic emitter emits ultrasonic waves for ultrasonic rolling; and (e) repeating the steps (b) to (d) until processing of all sectioning layers is completed, thereby completing the laser 3D printing forming of the amorphous alloy foil.

Further preferably, the amorphous alloy foil has a thickness of 30 μm to 150 μm.

Further preferably, the ultrasonic emitter in the roller has an ultrasonic frequency of 10 kHz to 30 kHz and an ultrasonic power of 30 W to 60 W.

Further preferably, the amorphous alloy foil is a Zr-based, Fe-based or Cu-based amorphous alloy.

In general, compared with the prior art, the present invention has the following beneficial effects:

1) in the present invention, the amorphous alloy foil is used as a raw material, and has a lower cost and a higher utilization rate than the traditional 3D printing amorphous powder, for the cost of the amorphous alloy powder is several tens to several hundred times that of the amorphous alloy foil, for example, the price of a Fe-based amorphous Alloy powder for the 3D printing is 1200 yuan per kilogram, while the price of the corresponding foil is less than 100 yuan per kilogram;

2) in the present invention, the amorphous alloy foil is rolled by a roller in combination with ultrasonic vibration, in which the ultrasonic vibration releases the residual stress in the amorphous alloy foil and the rolling improves the formability of the amorphous alloy, so that interatomic bonding between layers is enhanced, and the structure between the sectioning layers is more compact, thereby improving the internal structure density of the part;

3) in the present invention, the amorphous alloy foil is heated by a second laser to a temperature in the supercooled liquid region between the glass transition temperature and the initial crystallization temperature, and in this temperature range, the amorphous alloy foil exhibits superplasticity, namely, a small force can lead to great uniform deformation;

4) in the present invention, the Zr-based, Fe-based or Cu-based amorphous alloy foil, which has a thickness of 30 μm to 150 μm and features strong glass forming ability, good thermal stability and good thermoplastic forming property, is adopted, since strong glass forming ability and good thermal stability can avoid crystallization to the greatest extent, and good thermoplastic forming property can enable good formability;

5) the amorphous alloy foil used in the present invention has a lower cost and a higher utilization rate than the traditional 3D printing amorphous powder. Further, the heating temperature is in the supercooled liquid region lower than the initial crystallization temperature $T_x$, which can prevent the crystallization of the amorphous alloy during the forming process to ensure the amorphous structure of the part. In addition, the ultra-thin amorphous alloy foil is rolled by a roller, which can avoid the wavy interface between the layers of the foil and thus obtain an amorphous alloy sample with a better surface quality and a denser internal structure; through ultrasonic vibration assisted forming, the obtained vibration stress is superimposed with the internal residual stress, so that the residual stress is released and thus the residual stress is eliminated or reduced; meanwhile, due to ultrasonic softening effect, the flow of the amorphous alloy supercooled liquid is more uniform, improving the formability of the amorphous alloy and enhancing the interatomic bonding between the layers to make the structure denser; the contact between the roller and the foil is a line contact, and through the ultrasonic-assisted action, uneven deformation caused by the line contact is eliminated to form a uniform weld surface. By controlling the feeding of the foil, the present invention can also easily realize the preparation of the amorphous alloy-based composite material; and 6) in the present invention, through an ultrasonic emitter with a frequency of 10 kHz to 30 kHz and a power of 30 W to 60 W, the residual stress can be released or reduced to the maximum extent, and the formability of the amorphous alloy can be better improved.

BRIEF DESCRIPTION OF THE DRAWINGS

In all figures, the same elements or structures are denoted by the same reference numerals, in which.

1: roller, 2: part to be processed, 3: base plate, 4: lifting platform, 5: screw, 6: laser head, 7: optical fiber, 8: second laser emitter, 9: first laser emitter, 10: first laser cladding head, 11: air gun, 12: amorphous alloy foil, 13: scrap collecting tank, 14: feeding roller wheel, 15: discharging roller wheel, 16: suction nozzle, 102: resistance heating rod, 103: ultrasonic emitter, 1201: area between the external contour and the internal contour, 1202: internal contour, 1203: wad, 1024: process scrap waste material.

DETAILED DESCRIPTION OF THE PREFERRED EMBODIMENTS

For clear understanding of the objectives, features and advantages of the invention, detailed description of the invention will be given below in conjunction with accompanying drawings and specific embodiments. It should be noted that the embodiments described herein are only meant to explain the invention, and not to limit the scope of the invention.

Figure 1:
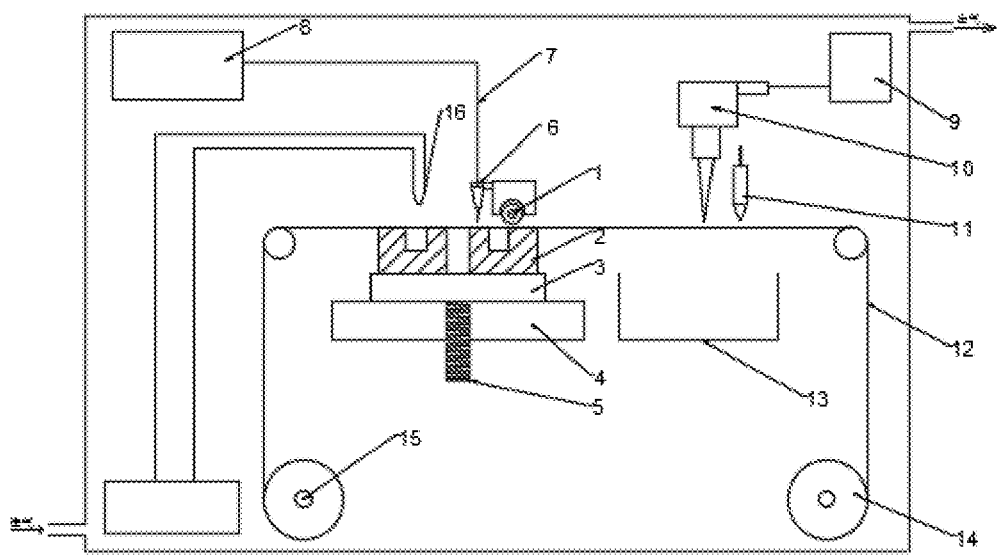
FIG. 1 is a structural schematic diagram of a laser 3D printing system of amorphous alloy foil according to a preferred embodiment of the present invention.

FIG. 1 is a structural schematic diagram of a laser 3D printing system of amorphous alloy foil according to a preferred embodiment of the present invention. As shown in FIG. 1, a laser 3D printing system of amorphous alloy foil comprises a first laser, a second laser, a base plate 3, a lifting platform 4 and a feeding mechanism, in which:

the feeding mechanism comprises a plurality of roller wheels including a feeding roller wheel 14, a discharging roller wheel 15 and a transition roller wheel, on which amorphous alloy foil is wound such that feeding and discharging of the amorphous alloy foil are achieved by the rotation of the feeding roller wheel 14 at the head end and the discharging roller wheel 15 at the tail end; the base plate 3 is a processing platform for the amorphous alloy foil, which is provided below the rear end of the feeding mechanism; the lifting platform 4 is provided below the base plate 3 to adjust the height of the base plate 3;

the first laser comprises a first laser emitter 9 and a first laser cladding head 10 and is provided above the front end of the feeding mechanism to achieve cutting of the internal contour on the amorphous alloy foil; the second laser comprises a second laser emitter 8, a laser head 6 and an optical fiber 7 connecting the second laser emitter to the laser head, and is provided above the rear end of the feeding mechanism in a manner of being opposite to the base plate 3 to selectively heat amorphous alloy foil on the base plate; a roller 1 is also connected to the laser head of the second laser and is used for rolling the selectively heated amorphous alloy foil; and a resistance heating rod 102 and an ultrasonic emitter 103 are provided in the roller, in which the resistance heating rod is used for preheating the roller, and the ultrasonic emitter is used for emitting ultrasonic waves during the rolling process so as to achieve ultrasonic rolling.

An air gun 11 is provided on one side of the first laser to remove scrap generated by cutting operation of the first laser, and meanwhile, a scrap collecting tank 13 is provided below the first laser and the air gun to collect the scrap; and a suction nozzle 16 is provided on one side of the second laser to suck and remove the scrap.

Preferably, the first laser is a UV pulsed laser, and the second laser is a continuous wave (CW) laser.

Figure 2:
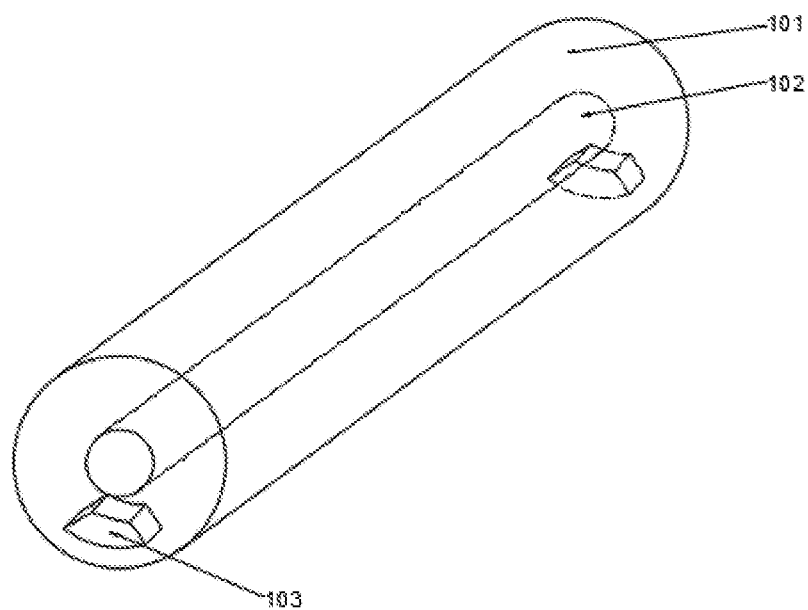
FIG. 2 is a structural schematic diagram of a roller according to the preferred embodiment of the present invention.

A screw 5 is provided below the lifting platform to adjust the height of the lifting platform. In addition, as shown in FIG. 2, the resistance heating rod 102 is provided in the center of the roller and has the same length as the roller such that the roller is preheated more uniformly and sufficiently, and the ultrasonic emitter 103 is provided on both ends of the roller.

The amorphous alloy foil has a thickness of 30 μm to 150 μm, and is an amorphous alloy with strong glass forming ability, good thermoplastic forming property and good thermal stability, such as Zr-based amorphous alloy, Fe-based amorphous alloy and Cu-based amorphous alloy.

Preferably, the amorphous alloy foil is heated by laser scanning heating (i.e., heated by the second laser). However, the heating mode is not only limited to that in the present invention, and various kinds of other heating modes can be adopted, such as heat conduction (e.g., direct heating through the roller), thermal convection (e.g., blowing hot air) and heat radiation.

The ultrasonic emitter has an ultrasonic frequency of 10 kHz to 30 kHz and an ultrasonic power of 30 W to 60 W.

The traveling speed of the roller is adjustable. Further, after cutting is performed by the first laser in accordance with the internal contour, the generated scrap is removed by air gun blowing, and can also be removed by a vacuum sucker and the like.

Figure 3:
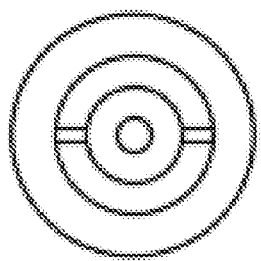
FIG. 3 is a structural schematic diagram of a typical part to be prepared by using the amorphous alloy foil according to the preferred embodiment of the present invention.
Figure 3:
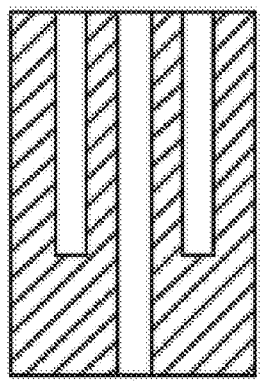
Figure 4:
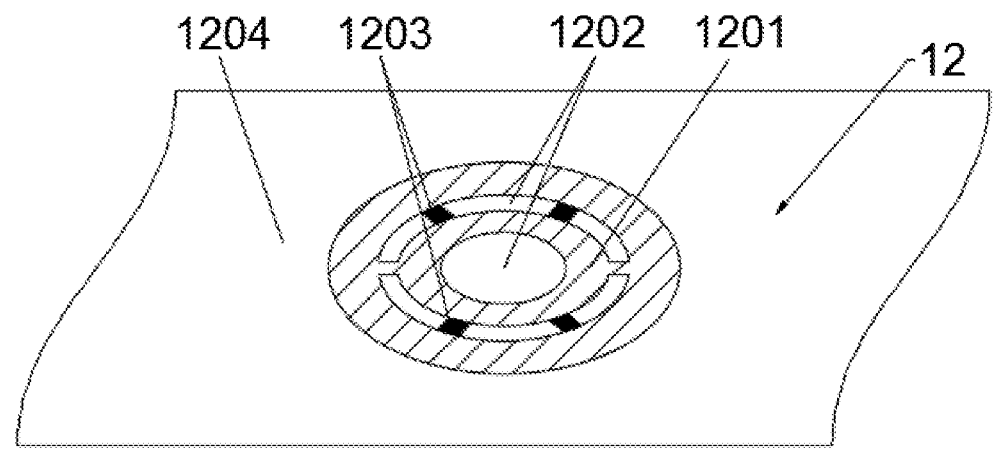
FIG. 4 is a schematic diagram of a single-layer sectioning layer of the typical part to be prepared by using the amorphous alloy foil according to the preferred embodiment of the present invention.
Figure 5:
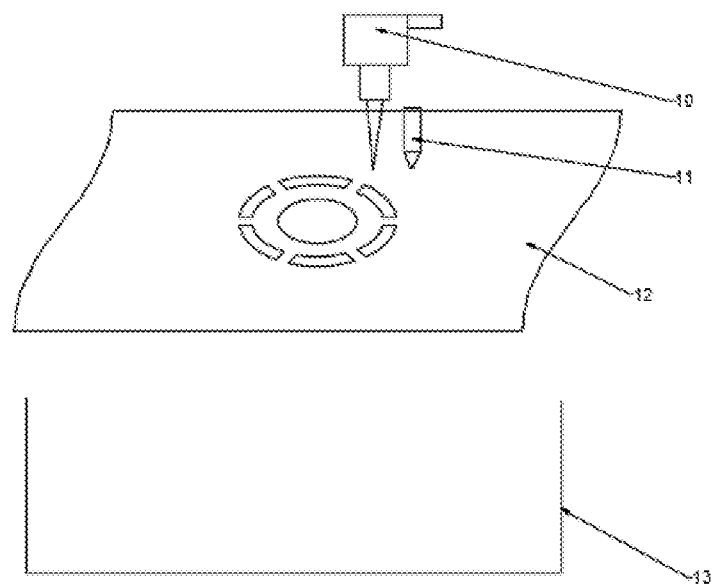
FIG. 5 is a schematic diagram showing cutting by a first laser according to the preferred embodiment of the present invention.

Provided a forming method of the laser 3D printing forming system of amorphous alloy foil. FIG. 3 shows a typical part to be prepared by using the amorphous alloy foil according to the preferred embodiment of the present invention. As shown in FIG. 3, the steps of processing the part in the FIG. 3 specifically include:

(1) The three-dimensional structure of a desired part is sectioned to obtain a plurality of sectioning layers and internal and external contour information of the part in each sectioning layer; FIG. 4 is a schematic diagram of a single-layer sectioning layer of the typical part to be prepared by using the amorphous alloy foil according to the preferred embodiment of the present invention, and FIG. 5 is a schematic diagram showing cutting by a first laser according to the preferred embodiment of the present invention. As shown in FIGS. 4 and 5, in order to print a sectioning layer shown in FIG. 4, the laser 3D printing forming system is placed in a shielding gas, the contour shown on the amorphous alloy foil 12 in FIG. 5 is cut by the first laser, structural scrap within the external contour on the amorphous alloy foil that has not fallen down is blown into a scrap collecting tank 13 through an air gun, and according to the designed feeding stroke, the foil after cutting is conveyed onto the base plate for the next operation.

Figure 6:
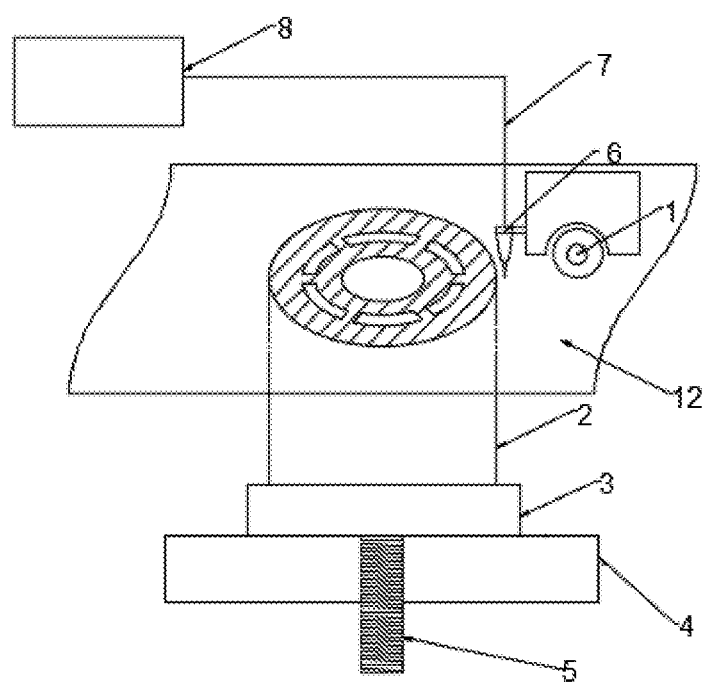
FIG. 6 is a schematic diagram showing transferring of the amorphous alloy foil onto a base plate according to the preferred embodiment of the present invention.

(2) FIG. 6 is a schematic diagram showing transferring of the amorphous alloy foil to the base plate according to the preferred embodiment of the present invention. As shown in FIG. 6, by programming, an area required to be heated by the second laser is set to be an area 1201 between the external contour and the internal contour shown by the shaded portion in FIG. 6. The amorphous alloy foil is linearly scanned by the laser beam of the second laser so as to achieve rapid heating. The heating area 1201 is scanned and heated by the second laser to a temperature in the supercooled liquid region between the glass transition temperature $T_g$ and the initial crystallization temperature $T_x$ of the amorphous alloy, and before the temperature begins to drop significantly, the roller 101 preheated by the resistance heating rod 102 rolls over the surface of the area such that the amorphous alloy foil in the supercooled liquid region is atomically bonded to the base plate (or the previous layer) through the pressure in combination with the ultrasonic waves generated on the surface of the roller 101 by the ultrasonic emitter 103, and thus, interatomic bonding in the amorphous structure is achieved between layers of the amorphous alloy foil.

Figure 7:
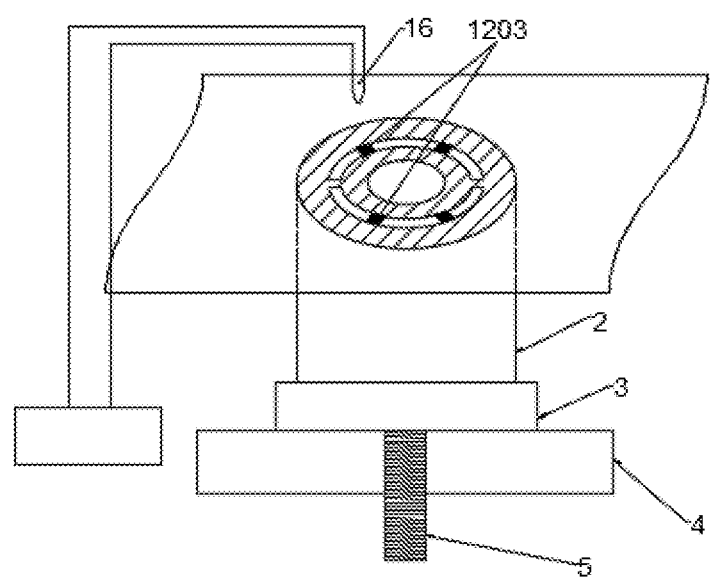
FIG. 7 is a schematic diagram showing operation of a suction nozzle according to the preferred embodiment of the present invention.

(3) After the processing of the heating area 1201 is completed, wad removing operation is performed. FIG. 7 is a schematic diagram showing operation of a suction nozzle according to the preferred embodiment of the present invention. As shown in FIG. 7, the wad 1203 is sucked and removed from the part through the suction nozzle 16 to ensure that the printing surface does not have any unnecessary wad, and then the next operation is performed.

(4) The lifting platform is lowered by 100 μm under the action of the screw 5 such that the welding portion of the foil is separated from the processing scrap 1204, and then under the action of the discharging roller wheel 15, the foil advances one stroke. The above operations are repeated until the processing of the part is completed.

While particular embodiments of the invention have been shown and described, it will be obvious to those skilled in the art that changes and modifications may be made without departing from the spirit and scope of the invention.

The invention claimed is:

1. A laser 3D printing forming system, comprising a first laser, a second laser, a base plate, a feeding mechanism, and an amorphous alloy foil, wherein, the feeding mechanism comprises a plurality of roller wheels, on which the amorphous alloy foil is wound such that feeding and discharging of the amorphous alloy foil are achieved by the rotation of a feeding roller wheel at the head end and a discharging roller wheel at the tail end; the base plate is provided below the rear end of the feeding mechanism and used as a processing platform for the amorphous alloy foil; a lifting platform is provided below the base plate;

the first laser is provided above the front end of the feeding mechanism to achieve cutting of the internal contour on the amorphous alloy foil; the second laser is provided above the rear end of the feeding mechanism in a manner of being opposite to the base plate to selectively heat the amorphous alloy foil on the base plate; the second laser is configured to heat the amorphous alloy foil to a temperature in a supercooled liquid region between a glass transition temperature and an initial crystallization temperature, a roller is connected to a laser head of the second laser and is used for rolling the amorphous alloy foil heated by the second laser; and a resistance heating rod and an ultrasonic emitter are provided in the roller, in which the resistance heating rod is used for preheating the roller, and the ultrasonic emitter is used for emitting ultrasonic waves during the rolling process to achieve ultrasonic rolling.

2. The laser 3D printing forming system of claim 1, wherein an air gun is provided on one side of the first laser to remove scrap generated by cutting operation of the first laser, and a scrap collecting tank is provided below the first laser and the air gun to collect the scrap.

3. The laser 3D printing forming system of claim 1, wherein a suction nozzle is provided on one side of the second laser to suck and remove the scrap.

4. The laser 3D printing forming system of claim 1, wherein the first laser is a UV pulsed laser, and the second laser is a CW laser.

5. The laser 3D printing forming system of claim 1, wherein a screw is provided below the lifting platform to adjust the height of the lifting platform; the resistance heating rod is provided in the center of the roller and has the same length as the roller; and the ultrasonic emitter is provided on both ends of the roller.

6. The laser 3D printing forming system of claim 1, wherein the amorphous alloy foil has a thickness of 30 μm to 150 μm.

7. The laser 3D printing forming system of claim 1, wherein the ultrasonic emitter in the roller has an ultrasonic frequency of 10 kHz to 30 kHz and an ultrasonic power of 30 W to 60 W.

8. The laser 3D printing forming system of claim 1, wherein the amorphous alloy foil is a Zr-based, Fe-based or Cu-based amorphous alloy.

9. The laser 3D printing forming system of claim 1, wherein the resistance heating rod is configured to preheat the roller to the glass transition temperature ±5K.

\* \* \* \* \*